United States Patent [19]

Tarver

[11] Patent Number: 4,939,730
[45] Date of Patent: Jul. 3, 1990

[54] AUTO ISOLATION CIRCUIT FOR MALFUNCTIONING CURRENT LOOP

[75] Inventor: James V. Tarver, Greensboro, N.C.
[73] Assignee: Gilbarco Inc., Greensboro, N.C.
[21] Appl. No.: 255,701
[22] Filed: Oct. 11, 1988
[51] Int. Cl.⁵ .................................................. G06F 11/00
[52] U.S. Cl. ........................................ 371/11.2; 371/20.6
[58] Field of Search ................ 371/11.1, 11.2, 11.3, 371/8.1, 8.2, 20.6

[56] References Cited

U.S. PATENT DOCUMENTS

| | | | |
|---|---|---|---|
| 3,445,811 | 5/1969 | Hashimoto et al. | 371/8.1 |
| 3,579,275 | 5/1971 | Polkinghorn et al. | 307/251 |
| 3,716,834 | 2/1973 | Adams | 340/147 |
| 3,876,983 | 4/1975 | Zafiropulo et al. | 371/11.2 |
| 3,974,403 | 8/1976 | Georgopoulos | 307/270 |
| 4,245,343 | 1/1981 | Frey | 371/11.2 |
| 4,264,894 | 4/1981 | Ellington | 371/11.2 |
| 4,685,113 | 8/1987 | Hono et al. | 375/7 |
| 4,723,241 | 2/1988 | Grobel et al. | 371/11.2 |

Primary Examiner—Charles E. Atkinson
Attorney, Agent, or Firm—Kenneth Watov

[57] ABSTRACT

In a data communication system including a plurality of remote units under the control of a master controller, whereby each of the remote units operates to transmit and receive data from the master controller, an interface circuit for connecting each remote unit to the controller includes a switching transistor operable via a timing network for turning on to apply a high level signal continuously on the remote data output terminal of the associated interface circuit, for effectively isolating the malfunctioning remote transceiver, while permitting normal system operation without interference from the malfunctioning unit.

14 Claims, 5 Drawing Sheets

AUTO ISOLATION CIRCUIT FOR MALFUNCTIONING CURRENT LOOP

FIELD OF THE INVENTION

The present invention relates generally to data communications systems including a master controller for transmitting and receiving data from a plurality of remotely located units, and more specifically relates to interface circuitry between the master controller and remote units for automatically isolating a malfunctioning remote device, while permitting substantially uninterrupted data communication between the master controller and the other remotely located devices.

BACKGROUND OF THE INVENTION

Many data communications systems include a master controller operating to control the operation of a plurality of remotely located devices. In controlling such remotely located devices, the master controller may both transmit and receive data from each one of the devices. For example, such a data communications system may be located in a modern gasoline service station, where a master controller located in the office of the station is connected to both transmit and receive data from current loop transceivers located in a plurality of pumps or fuel dispensing stations, respectively. In such a typical data communications system, where a plurality of current loop transceivers, for example, are communicating with a single master controller or similar device, if one of the current loop transceivers fails by either open-circuiting its connection to the data communication line, or shorting to ground the data communication line, the master controller loses communication with all of the remote devices. To restore communication therebetween, the defective device or current loop transceiver must be isolated from the communication data path. The typical method for isolating such malfunctioning devices or current loops, for example, is to physically switch the failed loop out of the system by manually switching each one of the remote units into and out of the data communication path, until the defective remote device is located. Such a method can be very time consuming, and may result in considerable data being lost between the master controller and the operational ones of the remote devices.

In the prior art, a number of circuits and methods have been developed for isolating a malfunctioning device in a data communication system. For example, in Hono et al. U.S. Pat. No. 4,685,113, a transceiver for a common bus-type transmission system of a local area network includes a receiver 3 for receiving data from a bus 2, and a switching transistor 6 for transmitting data signals from the transceiver to the bus 2, with the data transmission circuit also including a diode 7 between the collector of the transistor 6 and bus 2, with the diode 7 being polarized for blocking received data signals flowing from the bus 2 to the transistor 6, and further includes a first data detection circuit at the base of the transistor 6 for detecting data signals for transmission, a second data detection circuit coupled to the collector of the transistor 6 for sensing the presence of data signals to be transmitted to the bus 2, a determination circuit 11 having first and second input terminals connected to the output terminals of the first and second data detection circuits 9 and 10, respectively, for determining whether data transmission signals are substantially simultaneously present at both the base and collector electrodes of the transistor 6, for closing a switch 12 upon such simultaneous occurrence for permitting data signals to be coupled through the diode 7 to the bus 2, or for opening the switch 12 to prevent such transmission of data signals during times that such signals are not detected simultaneously by both the first and second data detection circuits. In this manner, if either the transistor 6 or diode 7 are defective, the data transmission driver circuit 5 of the transceiver is disconnected from the bus 2, to prevent interference with data communication between the bus 2 and other transceivers connected to the bus. However, data signals from the bus 2 continue to be received by the transceiver via the receiver 3.

Georgopoulos, U.S. Pat. No. 3,974,403, discloses a digital data transmission system, including a common transmission line, a plurality of input/output devices coupled to the transmission line, with each such device including an output transistor coupled to a voltage supply through a first transistor, with the system further including an electronic switch coupled to the base electrode of the first transistor of each one of the plurality input/output devices for interrupting the flow of base current to the first transistor whenever a short circuit condition occurs in the driver circuit, for removing the driver circuit from the transmission line.

Adams, U.S. Pat. No. 3,716,834 discloses a system for use with a data transmission network having a central station and a plurality of remote stations connected in series by a low grade transmission line, such as a two conductor telephone line. The system includes detection circuitry for detecting transmission line faults caused by defects in one or more of the remote stations such as short circuits to ground, open circuit conditions, line-to-line shorts, and so forth, whereby the detection circuitry operates to open switches for decoupling the defective ones of the remote stations from the series line, while at the same time, closing other switches to bypass the defective remote stations to maintain the series connected transmission network between the central station and the operating ones of the remote stations.

Polkinghorn et al., U.S. Pat. No. 3,579,275 discloses an isolation circuit for gating devices for charging and discharging a number of capacitors during different recurring time intervals, for turning on an MOS device as a function of the charge on a particular one of the capacitors serving as a feedback capacitor, for driving the output of the gating device to approximately the voltage level of a clock source, for neutralizing noise appearing at the output and for providing a low output impedance.

SUMMARY OF THE INVENTION

An object of the invention is to provide a circuit for isolating one or more malfunctioning current loops from a master controller providing control over such current loops and other current loops.

Another object of the invention is to automatically sense a fault in a remote transceiver, for substantially immediately isolating the defective transceiver from its interconnection to a master controller.

Another object of the invention is to prevent data transmitted to a remotely current loop transceiver from appearing on the data output line from the current loop transceiver.

Another object of the invention is to provide a circuit for detecting either an open-circuit condition or a short-to-ground condition on the data line of a current loop transceiver, for causing a high-level signal or digital "1" to appear on the data output line from the current loop transceiver, for isolating the defective transceiver.

These and other objects of the invention are provided by a circuit connected between a remote data output line and a transmit data input line, and the data or loop return line of a current loop transceiver, with the circuit including means for causing a high-level signal to appear at the remote data output line while connecting transmitted data to the loop return line, and isolation means for detecting either an open-circuit condition or a short circuit-to-ground condition in the loop return line, for applying a high-level signal or digital "1" signal to the remote data output line at times that either of such conditions exist.

BRIEF DESCRIPTION OF THE DRAWINGS

An illustration of the present invention and its operation is given below with reference to the accompanying drawings, in which like items are indicated by the same reference number, wherein.

DESCRIPTION OF THE PREFERRED EMBODIMENTS OF THE INVENTION

Figure 1:
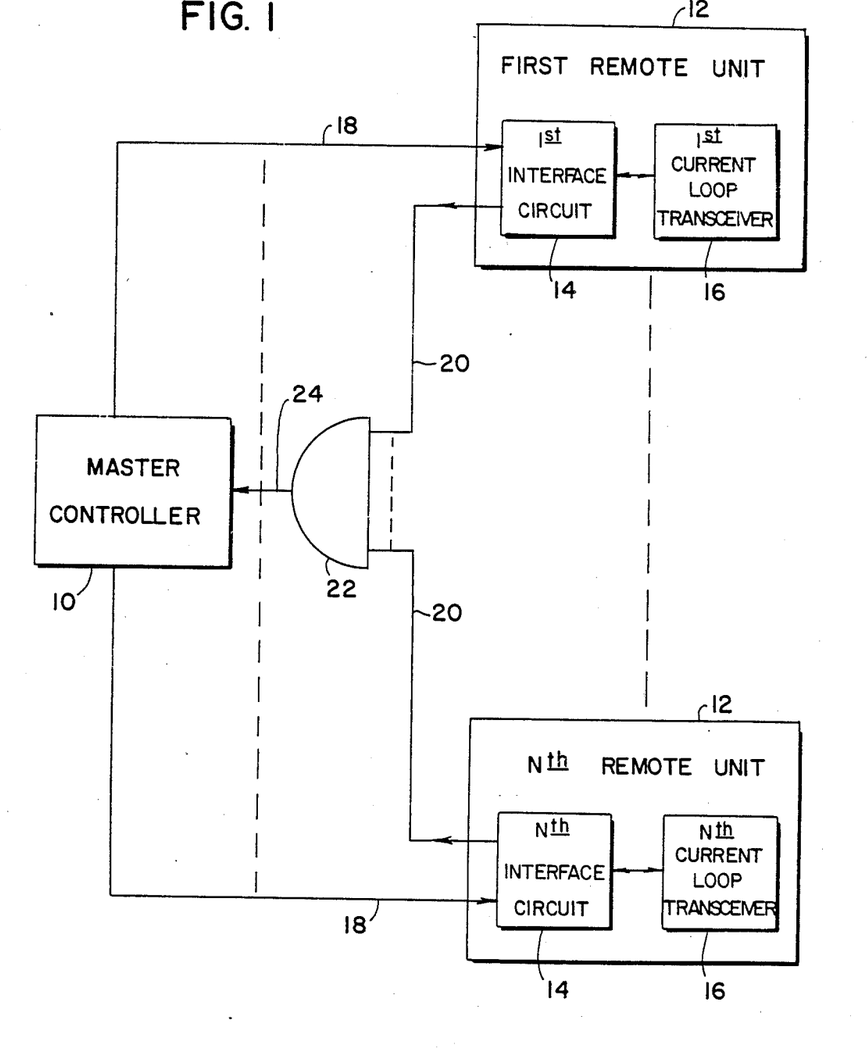
FIG. 1 is a block/schematic diagram illustrating; a data communication system incorporating one embodiment of the present invention.

In FIG. 1, a typical data communication system incorporating one embodiment of the present invention includes a master controller 10 for both transmitting and receiving data from a plurality of remotely located units 12. Each of the remote units 12 include, in this illustration, an interface circuit 14, and a remote current loop or current loop transceiver 16. In this example, data is transmitted from the master controller over independent transmit data input lines 18, which can also be a common bus, to the interface circuits 14 of each one of the first through nth remote units 12, respectively. In turn, the interface circuits 14 pass the data from the master controller 10 to their associated remote current loop or current loop transceiver 16.

The current loop transceivers 16 each transmit data through their associated interface circuit 14, from which the data is transmitted along individual remote data output lines 20, respectively, for connecting the data to individual input terminals, respectively, of an AND gate 22, in this example. The output of the AND gate 22 is applied to the master controller 10 as an input thereto via output data line 24. Note that in this example it is assumed that the data transmitted to the master controller 10 from the remote units 12 is multiplexed over the AND gate data output line 24. Also note, in this example, that if data is being transmitted from one of the remote units 12 at a given time along a data line 20 to AND gate 22, the other ones of the data lines 20 must be providing a digital "1", in order to enable the AND gate 22 for passing the transmitted data from the active one of the data lines 20.

The data communications system shown in FIG. 1 may be applicable for use in many different applications. As previously mentioned, one application could be for providing the data communications system in a gasoline service station. The master controller 10 is typically located in a central office, and communicates with the remote units 12, each of which may typically be located in a remote gasoline dispensing unit. The AND gate 22 may be located at any convenient location between the master controller 10 and the remote units 12, but is ideally located at a position where the lengths of the remote data output lines 20 are minimized.

Figure 2:
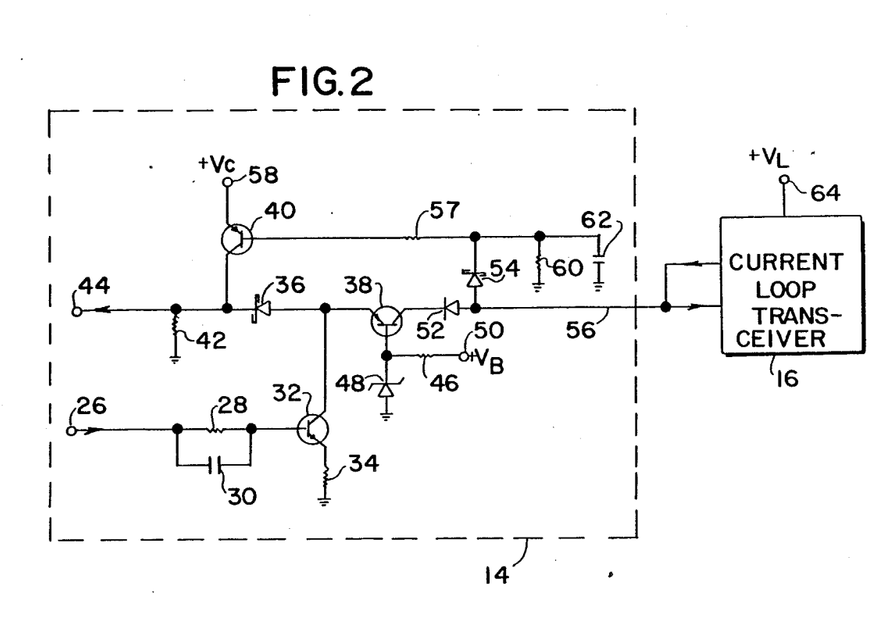
FIG. 2 is a schematic diagram of an interface circuit including a preferred embodiment of the invention.

In FIG. 2, a preferred embodiment of the interface or auto-isolation circuit 14 is shown. Each of these circuits 14 include a transmit data input terminal 26 for connection to an appropriate one of the transmit data lines 18. This terminal 26 is connected to the base electrode of an NPN switching transistor 32 via the parallel combination of an input or base current reducing resistor 28 and high frequency bypass capacitor 30 (for providing higher speed switching of transistor 32). The emitter electrode of NPN transistor 32 is connected via resistor 34 to ground, and its collector electrode is connected to the common connection of the anode electrode of a Schottky diode 36, and the emitter electrode of another NPN switching transistor 38. The cathode of Schottky diode 36 is connected to the common connection of the collector electrode of an PNP switching transistor 40, one end of a current limiting resistor 42, and to remote data output terminal 44.

The base electrode of NPN switching transistor 38 is connected in common to one end of current limiting resistor 46, and the cathode of a Zener diode 48. The other end of resistor 46 is connected to a terminal 50 for receiving a supply voltage $+V_B$. The collector electrode of NPN switching transistor 38 is connected to the cathode electrode of a diode 52. The anode electrode of diode 52 is connected in common to the anode electrode of a Schottky diode 54 and to the loop return signal line 56 of the current loop transceiver 16. The cathode electrode of the Schottky diode 54 is connected in common to one end of a base current limiting resistor 57, one end of a timing resistor 60, and one end of a timing capacitor 62, the other ends of the latter two being connected to a source of reference potential, ground in this example. The other end of base current limiting resistor 57 is connected to the base electrode of PNP switching transistor 40, the latter having its emitter electrode connected to a voltage terminal 58 for receiving a supply voltage $+V_C$. Note that transistors 32 and 38 are each configured as emitter followers. Also note that the current loop transceiver 16 is connected to a terminal 64 for receiving a source of voltage $+V_L$.

With further reference to FIG. 2, operation of the preferred embodiment of the invention will now be described. In normal operation, data is transmitted from the current loop transceiver via the loop return line 56, the collector-emitter current path of transistor 38, through Schottky diode 36, for application to the remote data output terminal 44. The voltage developed along the loop return line 56, that is at the common connection of the anodes of diodes 52 and 54, must be greater than the sum of the voltage drops across diode 52, the collector-emitter electrodes of transistor 38, and Schottky diode 36, and the desired output voltage 44 which is developed across resistor 42. This assumes that the resistance of resistor 42 is relatively high compared to the impedance between this resistor 42 and the current loop transceiver 16, and further assumes that the impedance represented by the remote data line 20 and input impedance of the associated AND gate 22 input is also relatively high. In other words, the signal voltage developed along loop return line 56 for remote data output signals must be great enough to drive signal current through the circuit. When this occurs, this same voltage charges timing capacitor 62 via the current path provided by Schottky diode 54. The voltage developed across capacitor 62 is sufficiently high enough to cut off transistor 40, and to maintain transistor 40 cut off during normal operation of the associated loop transceiver 16. Also, transistor 38 is biased at its base via the combination of resistor 46 and Zener diode 48, for establishing the required remote data output voltage for passing remote data output signals to terminal 44, that is the voltage across resistor 42.

During periods of time when the master controller 10 is transmitting data via an appropriate transmit data line 18 to terminal 26, positive-going or high-level data bits (at digital "1") cause transistor 32 to conduct. The value of resistance of emitter resistor 34 determines the magnitude of the loop current flowing through transistor 32. At such times that the transmit data is high or at a digital "1", the loop current is in a "marking" state. A "spacing" state occurs when the transmit data from the master controller 10 is low, that is at "digital 0", causing transistor 32 to be cut off, and the loop return voltage along loop return line 56 to increase to approximately the level of the loop supply voltage $+V_L$. Accordingly, during spacing states, timing capacitor 62 is charged to a greater voltage level, approaching the voltage on loop return line 56.

Whenever transistor 32 is turned on or in the marking state, the impedance between its collector and emitter electrodes in series with resistor 34 is connected in a parallel load configuration with the series connection of Schottky diode 36 and resistor 42, for providing a parallel emitter load to transistor 38. When transistor 32 is cut off, or in a spacing state, transistor 32 and resistor 34 are effectively removed from being in a parallel load configuration at the emitter electrode of transistor 38, because of the substantially high impedance developed between the collector and emitter electrodes of transistor 32 at times that it is cut off. During such times, the only current path for loop current from the emitter electrode of transistor 38 to ground is provided by the series connection of Schottky diode 36 and resistor 42. In the preferred embodiment, resistor 42 is selected to have a relatively high value of resistance for substantially reducing the loop current to a magnitude of zero. However, the voltage developed across resistor 42 remains at the same level that occurs when the data on the transmit data line 18 connected to terminal 26 is "high" or at a marking state level. As a result, self-cancellation of transmitted data that might otherwise appear at the remote data output terminal 44 is automatically provided during periods of time that the master controller 10 is transmitting data to the associated interface circuit 14.

Figure 3:
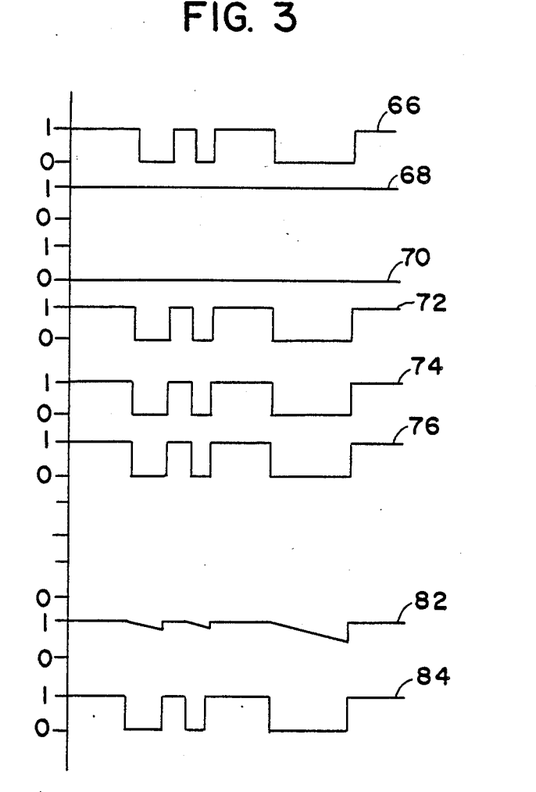
FIG. 3 is a waveform diagram or timing diagram illustrating a normally operating data communications system incorporating one embodiment of the present invention.

In FIG. 3, the voltage and current waveforms, expressed in terms of digital levels of "1" (a high level), and "0" (a low level), are shown for different portions of the circuit of FIG. 2, during normal operation when the master controller 10 is transmitting data to the illustrated interface circuit 14, for inputting data to the associated current loop transceiver 16. More specifically, waveform 66 represents an example of a typical transmitted data stream received from the master controller 10. Waveform 68 shows the signal developed at remote data output terminal 44, which as previously explained remains at a digital "1" or at a high level during the time of receipt of transmitted data from the master controller 10. Waveform 70 represents the magnitude of current flowing through transistor 40 at this time, which as shown is at zero magnitude throughout the period of time that transmitted data is received from master controller 10, during normal operation. Waveform 72 represents the relative magnitude of collector-emitter current flowing through transistor 32 during the illustrated period of time. As would be expected, the current is at a high level at times that the transmitted data is high, and at a low level during times that the transmitted data is at a low level. Also as would be expected, waveform 74 is substantially identical to waveform 72, and represents the magnitude of current flowing from terminal 64 into the current loop transceiver 16, which current is typically designated as the "loop current". Waveform 76 represents the voltage developed between the loop return line 56 and ground, in this example designated as the "loop voltage".

Waveform 82 shows the voltage developed across timing capacitor 62 over the illustrated period of receipt of transmitted data. Lastly, waveform 84 shows the transmitted data signals received from the master controller 10 by the other ones of the current loop transceivers 16 shown in FIG. 1, in the instance where the master controller 10 is during normal operation transmitting the same data at the same time to each one of the remote units 12 (see FIG. 1).

Figure 5:
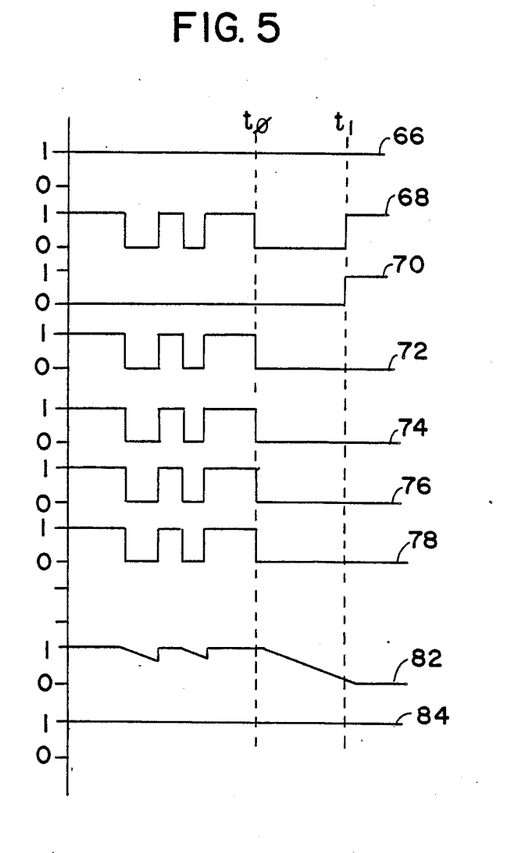
FIG. 5 illustrates the operation of one embodiment of the invention over a time period during which a remotely located current loop transceiver is transmitting data to a master controller.

With further reference to FIGS. 3 and 5, when the remote device, that is the current loop transceiver 16 of this example, is in the "spacing" state, no current flows in the current loop transceiver 16, as indicated by waveform 74. Also, as indicated by waveform 74, the loop voltage also approaches zero volts. Shortly after the initiation of the spacing state, the base electrode of transistor 38 begins to draw current from the $+V_B$ supply via resistor 46, causing the voltage at the base electrode to approach zero volts. As a result, the low base voltage at this time causes a substantially low voltage to be developed across resistor 42, thereby producing a low output voltage for representing a remote unit in a "spacing state". Also, during this spacing state, capacitor 62 begins to discharge through resistor 60. If the current loop transceiver 16 is not returned to a marking state in a sufficient period of time, capacitor 62 will discharge to a relatively low voltage level for causing transistor 40 to turn on. Once transistor 40 turns on, a voltage approaching $+V_C$ will be applied across resistor 42, causing the remote data output line to be stepped back up to a high level representing a marking state. At this time, Schottky diode 36 blocks the flow of current between transistors 40 and 32, thereby preventing excessive current drain during prolonged isolation periods. When the current loop transceiver 16, in this example, is returned to a marking state, capacitor 62 again charges to a sufficient level of voltage for turning off transistor 40, returning the system to normal operation as previously described.

Figure 4:
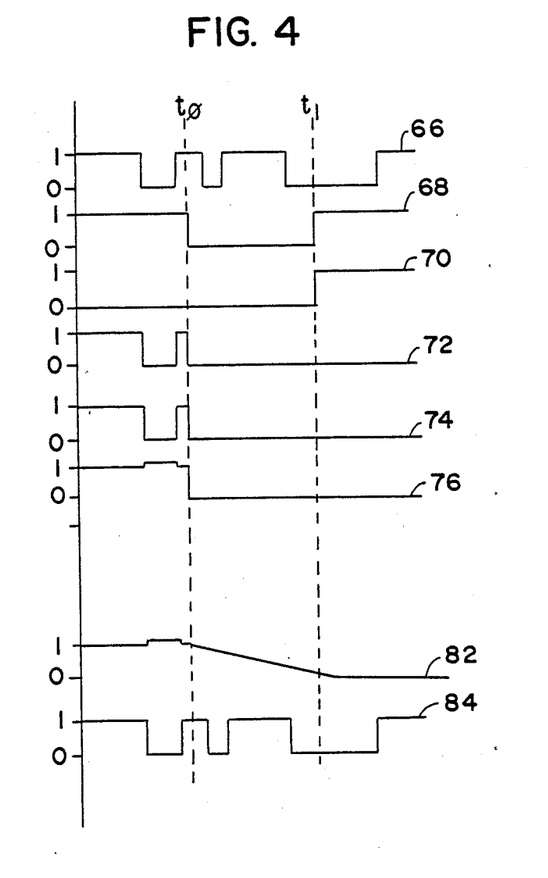
FIG. 4 is a waveform or timing diagram illustrating operation of one embodiment of the invention over a time period in which a master unit or controller is transmitting to a remotely located current loop transceiver.

With reference to FIG. 4, assume that the master controller 10 is transmitting data to each one of the remote units 12. Further assume that at a time $t_0$, one of the current loop transceivers 16 becomes open-circuited, or fails in a manner causing the associated loop return line 56 to be shorted to ground. As shown by waveform 68, this causes the voltage at the output terminal of AND gate 22, that is along the output line 24 to abruptly step to a low or "0" level. As shown by waveform 72, the current flowing through the collector-emitter current path of transistor 32 abruptly falls to zero as the result of the termination of current from the associated current loop transceiver 16, in this example. Also, the loop current 74 abruptly drops to "0" magnitude, as does the level of the loop voltage 76.

As shown by waveform 82, for depicting the voltage across capacitor 62 of the interface circuit 14 associated with the malfunctioning current loop transceiver 16, this voltage begins to decrease towards a "0" level. The capacitor 62 discharges to a sufficiently low level at time $t_1$, for causing the associated transistor 40 to turn on, causing collector-emitter current to flow through transistor 40 to resistor 42, the current attaining a relative magnitude of "1" as shown by waveform 70. As previously explained, this in turn causes the voltage at the remote data output terminal 44 of the associated interface circuit 14 to abruptly change to a digital "1" level, causing the system to return to normal operation. In turn, as shown by waveform 68, the level of the output signal from AND gate 22 abruptly changes to a digital "1" level.

In this manner, the malfunctioning current loop transceiver 16 is effectively isolated from the rest of the system, for automatically permitting the system to return to normal operation. The time for accomplishing this automatic isolation of the malfunctioning current loop transceiver 16 is substantially equivalent to the time constant represented by the values of resistor 60 and capacitor 62.

In a typical application involving +5.0 volt digital logic levels, capacitor 62 may be at a value of 0.1 microfarads, and resistor 60 at a value of 100,000 ohms. Accordingly the time constant is about 10 milliseconds. In using such values, the interface circuit 14 associated with the malfunctioning current loop transceiver 16 operates in about 10 milliseconds to isolate the malfunctioning current loop transceiver 16 from the rest of the system, for restoring the system back to normal operation.

With reference to FIG. 5, the relationship between the various voltage and current waveforms are shown for a period of time where one of the remote units 12 is transmitting data to the master controller 10, during which time at $t_0$ the associated current loop transceiver 16 either becomes open circuited or grounds the loop return line 56. Note that during this time the transmit data lines 18 from the master controller 10 each have a continuously high level or "1" signal, as shown by waveform 66. The output of AND gate 22 causes data represented by waveform 68 to be provided to master controller 10 via output line 24. The collector-emitter current flowing through the transistor 32 has magnitudes as shown by waveform 72. The loop current 74 and loop voltage 76, which were tracking the current loop transceiver transmitted data 78 up to time $t_0$, thereafter abruptly fall to a "0" level, as shown. Also, as previously described, the voltage 82 across the capacitor 62 associated with the malfunctioning current loop transceiver 16 begins to decrease towards 0 volts shortly after time $t_0$, until time $t_1$ when the associated transistor 40 turns on for restoring the system back to normal operation and automatically isolating the malfunctioning current loop transceiver 16.

Accordingly, through use of the preferred embodiment of the present invention, a malfunctioning current loop transceiver 16 is automatically isolated from the system by operation of the auto isolation circuitry of its associated interface circuit 14. This occurs regardless of whether the master controller 10 is transmitting data to the remote units 12, or whether one of the remote units 12 is transmitting data to the master controller 10.

Although the preferred embodiment of the invention has been described and illustrated for use with a plurality of current loop transceivers 16 each communicating with a master controller 10 via an associated interface circuit 14, and a common AND gate 22, and for receiving data from the master controller 10 via the associated one of the interface circuits 14, whereby the interface circuits 14 each include circuitry for automatically isolating the associated current loop transceiver from the system in the event of malfunctioning of the latter, such illustrated use of the auto isolating interface circuits 14 is not meant to be limiting, and other applications for such auto isolating interface circuitry 14 may occur to those having ordinary skill in the field of the related art.

I claim:

1. A data communication system comprising:

a plurality of remote devices each including a loop return line for passing data to and transmitting data from the remote device;

a plurality of remote devices each including a loop return line for passing data to and transmitting data from the remote device;

a plurality of interface circuits each associated with an individual one of said plurality of remote devices, respectively, each having a first terminal for connection to an end of said loop return line, the latter having another end connected to said remote device, a second terminal for receiving data to transfer to said loop return line, and a third terminal for transmitting data received from the associated said remote device via said loop return line;

master controller means having a plurality of transmit data lines connected individually to said second terminals of said plurality of interface circuits, respectively, and an input data line for receiving data from said plurality of remote devices;

AND gate means having a plurality of input lines connected individually to said third terminals of said plurality of interface circuits, respectively, and an output terminal connected to an end of said input data line of said master controller means; and each one of said interface circuits include isolation circuit means for applying a digital "1" on the associated third terminal in response to said associated remote device faulting, by its loop return line becoming either open-circuited or shorted to a source of reference potential, thereby effectively isolating the associated remote device from said AND gate means, while permitting said AND gate means to be primed for passing data from the normally operating ones of said remote devices to said master controller means.

2. The data communication system of claim 1, wherein each one of said interface circuits further include means for applying a digital "1" to its third terminal, whenever its second terminal is receiving data in a spacing state from said master controller.

3. The system of claim 2, wherein said means for applying a digital "1" to said third terminal, whenever said second terminal is receiving data in a spacing state, includes:
- a first resistor having one end connected to a source of reference potential;
- a first NPN transistor having a base electrode connected to said second terminal, an emitter electrode connected to the other end of said first resistor, and a collector electrode;
- a second NPN transistor having an emitter electrode connected to the collector electrode of said first NPN transistor, a base electrode connected to a source of bias voltage, and a collector electrode;
- a first diode having a cathode electrode connected to the collector electrode of said second NPN transistor, and an anode electrode connected to said first terminal;
- a second diode having an anode electrode connected to the common connection of the collector and emitter electrodes of said first and second NPN transistors, respectively, and a cathode electrode connected to said third terminal; and
- a relatively high impedance second resistor connected between said third terminal and a source of reference potential, wherein said source of bias voltage is at a level for causing said second NPN transistor to draw base current, during times that data signals at said second terminal are in a spacing state, for causing a high level voltage to be developed across said second resistor, for forcing the voltage across said second resistor to be at the same level regardless of whether data signals at said second terminal are in a marking or spacing state, thereby providing self-cancelling at said third terminal of data signals received at said second terminal.

4. The system of claim 1, wherein said isolation circuit means of each one of said interface circuits includes:
- a source of voltage indicative of a digital "1";
- transistor switch means having a main current path connected between said source of voltage and said third terminal, and a control electrode for receiving a control signal, said transistor switch means being responsive to said control signal for turning on to substantially lower the impedance of its main current path for connecting said source of voltage to said third terminal; and
- sensing means connected between said control electrode and said loop return line, for applying said control signal to said control electrode, whenever the associated remote device faults by either open-circuiting or connecting said loop return line to ground.

5. The system of claim 4, wherein said sensing means further includes means for delaying the application of said control signal to said control electrode until the associated remote device has been in a fault condition for a predetermined period to time.

6. The system of claim 4, wherein said sensing means includes:
- charge storage means connected between said first terminal and said control electrode, for charging to a level of voltage for keeping said transistor switch means turned off whenever data signals are present at said first terminal within at least each one of predetermined successive periods of time, and for discharging to a level of voltage indicative of said control signal for turning on said transistor switch means, whenever data signals are not present at said first terminal for a predetermined period of time.

7. The system of claim 6, wherein said charge storage means includes:
- a first resistor havinq one end connected to the control electrode of said transistor switch means;
- a capacitor connected between the other end of said first resistor and a source of reference potential;
- a second resistor connected in parallel with said capacitor; and
- diode means connected between said first terminal and the other end of said first resistor, said diode means being polarized for permitting current to flow between said first terminal and said capacitor for charging the latter, and for blocking the flow of discharge current therebetween, whereby if no data signals appear at said first terminal for a predetermined period of time, said capacitor discharges through said second resistor to said source of reference potential, reducing to a level of voltage across said capacitor equivalent to said control signal for turning on said transistor switch means to apply said source of voltage to said third terminal.

8. The system of claim 7, wherein said transistor switch means is a PNP bipolar transistor, and said diode means is a Shockley diode, wherein said PNP bipolar transistor including an emitter electrode connected to said voltage source, a collector electrode connected to said third terminal, and base electrode for said control electrode.

9. In a system including a plurality of remote devices each consisting of a current loop transceiver having a data terminal for both transmitting data from said remote device, and receiving data transmitted to said remote device, said system further including a plurality of interface circuits each associated with an individual one of said current loop transceivers, respectively, each one of said interface circuits comprising:
- a current loop return line having one end connected to said data terminal of its associated said current loop transceiver, and another end connected to a transfer terminal of said interface circuit;
- a remote data output terminal;
- an input terminal for receiving input data signals;
- first transfer circuit means connected between said current loop return line and said remote data output terminal, for transferring output data signals from its associated said current loop transceiver to said remote data output terminal;
- second transfer circuit means connected between said input terminal and said current loop return line, for transferring data from said input terminal to its associated said current loop transceiver; and
- isolation circuit means connected between said current loop return line and said remote data output terminal, for applying a high-level signal to said remote data output terminal in response to its associated said current loop transceiver having its loop return line become either open-circuited, or shorted to a source of reference potential; and said system further including gating means responsive to the appearance of said high-level signal at said remote data output terminal for effectively isolating the associated said current loop transceiver from the rest of said system.

10. The system of claim 9, wherein said first transfer circuit means includes:

first transistor means having a main current path connected between said current loop return line and said remote data out terminal, and a control electrode; and biasing means connected to said control electrode, for applying a bias potential to said control electrode, for operating said transistor means to pass data signals from said current loop return line to said remote data out terminal.

11. The system of claim 10, wherein said second transfer circuit means includes:

second transistor means having a main current path connected between one end of the main current path of said first transistor means and a source of reference potential, and a control electrode connected to said input terminal, whereby said input data signals are passed through the main current paths of said first and second transistor means to said remote current loop return line.

12. The system of claim 10, wherein said isolation circuit means includes:

switching transistor means having a main current path connected between a source of voltage for said high level signal and said remote data out terminal, and a control electrode for receiving a control signal, said switching transistor means being responsive to said control signal for turning on to substantially reduce the impedance in its main current path for applying said source of voltage to said remote data out terminal; and sensing means connected between said control electrode of said switching transistor means and said current loop return line, for sensing both open-circuit and short conditions in the associated current loop transceiver for longer than a predetermined period of time, for upon the occurrence of either such condition applying said control signal to said control electrode of said switching transistor means.

13. The system of claim 12, wherein said sensing means includes:

a first resistor having one end connected to said control electrode of said switching transistor means;

a capacitor connected between the other end of said first resistor and a source of reference potential;

a second resistor connected in parallel with said capacitor; and diode means connected between said current loop return line and the common connection between said first resistor and capacitor, said diode means being polarized for permitting current to flow between said current loop return line and said capacitor, for charging the latter to above a predetermined level of voltage at times that data signals are present on said current loop return line for greater than a predetermined period of time, and for blocking discharge current from flowing from said capacitor to said current loop return line, whereby during time periods greater than a predetermined period of time that data signals are not present on said current loop return line, said capacitor discharges through said second resistor to a level representative of said control signal for turning on said switching transistor means.

14. In a system including master controller means for transmitting data to and receiving data from plurality of remote devices connected in parallel with said master controller means, and a plurality of interface circuit means for passing data between said master controller means and said remote devices, respectively, wherein each one of said plurality of interface circuit means comprises isolation circuit means for detecting either an open-circuit condition or a short to ground condition in said associated remote device, or an open-circuit or short circuit condition in data lines between said remote device and said master controller means, for effectively isolating said remote device from the rest of said system, thereby permitting normal data communication between said master controller and the other ones of said remote devices.

* * * * *

UNITED STATES PATENT AND TRADEMARK OFFICE
CERTIFICATE OF CORRECTION

PATENT NO. : 4,939,730

DATED : July 3, 1990

INVENTOR(S) : James V. Tarver

It is certified that error appears in the above-identified patent and that said Letters Patent is hereby corrected as shown below:

Column 8, lines 36, 37, and 38:
Claim 1, lines 5, 6, and 7, delete these lines.

Column 10, line 14:
Claim 7, line 3, change "having" to --having--.

Column 10, line 36:
Claim 8, line 3, change "Shockley" to --Schottky--.

Signed and Sealed this

Third Day of September, 1991

*Attest:*

HARRY F. MANBECK, JR.

*Attesting Officer*  *Commissioner of Patents and Trademarks*